United States Patent [19]

Glass

[11] Patent Number: 4,529,791
[45] Date of Patent: Jul. 16, 1985

[54] INTERFACIAL POLYCARBONATE PREPARATION BY ADDING ADDITIONAL SOLVENT

[75] Inventor: Sarah M. Glass, Richwood, Tex.

[73] Assignee: The Dow Chemical Company, Midland, Mich.

[21] Appl. No.: 637,659

[22] Filed: Aug. 3, 1984

Related U.S. Application Data

[63] Continuation-in-part of Ser. No. 229,242, Jan. 28, 1981, abandoned, Ser. No. 386,870, Jun. 10, 1982, abandoned, Ser. No. 463,762, Feb. 4, 1983, abandoned, and Ser. No. 577,477, Feb. 6, 1984, abandoned.

[51] Int. Cl.$^3$ ............................................. C08G 63/62
[52] U.S. Cl. .................................... 528/196; 528/198; 528/199
[58] Field of Search ....................... 528/196, 198, 199

[56] References Cited

U.S. PATENT DOCUMENTS

| | | | |
|---|---|---|---|
| 3,945,969 | 3/1976 | Horn et al. | 528/196 |
| 4,122,112 | 10/1978 | Koda et al. | 260/463 |
| 4,255,557 | 3/1981 | Megumi et al. | 528/196 |

Primary Examiner—Harold D. Anderson
Attorney, Agent, or Firm—B. G. Colley

[57] ABSTRACT

An interfacial process for the preparation of polycarbonates having improved optical properties is disclosed wherein dihydric phenols are reacted with phosgene in the presence of an aqueous alkali solution and an organic solvent. After the polycarbonate oligomers are formed, the reaction mixture is diluted with additional solvent (25 to 125 volume percent). A polymerization catalyst such as triethylamine is then added to generate high molecular polycarbonates and the resins are then recovered.

16 Claims, No Drawings

INTERFACIAL POLYCARBONATE PREPARATION BY ADDING ADDITIONAL SOLVENT

CROSS REFERENCE TO RELATED APPLICATIONS

This application is a continuation-in-part of Ser. No. 229,242, filed Jan. 28, 1981, now abandoned, a continuation-in-part of Ser. No. 386,870, filed June 10, 1982, now abandoned, a continuation-in-part of Ser. No. 463,762, filed Feb. 4, 1983, now abandoned, and a continuation-in-part of Ser. No. 577,477 filed Feb. 6, 1984, now abandoned.

BACKGROUND OF THE INVENTION

This invention relates to a method of preparing polycarbonates by the interfacial technique using organic solvents.

It is known from U.S. Pat. No. 3,275,601, dated Sept. 27, 1966 that trialkylamines are effective to promote the polymerization of polycarbonate resins by an interfacial process. Other patents such as U.S. Pat. Nos. 3,185,664; 3,261,810; and 3,763,099 have indicated that other catalysts can be used such as phosphonium, arsonium, sulfonium, guanidine, and diamido compounds.

SUMMARY OF THE INVENTION

It now has been discovered that thermoplastic aromatic polycarbonates can be made by an improved process wherein a dihydric phenol is reacted with phosgene under interfacial process conditions in the presence of an organic solvent to generate a reaction mixture containing polycarbonate oligomers, adding 25 to 125 percent by volume based on the amount of the original solvent of additional organic solvent to the reaction mixture, adding a polymerization catalyst, stirring the reaction mixture for a period of time to complete the polymerization reaction, and recovering the polycarbonate.

The amount of additional solvent added to the reaction mixture is in the range from 25 to 125 percent by volume and preferably 40 to 100 percent by volume of the original amount used.

The process is useful to make thermoplastic polycarbonates having a reduced yellowness index and increased light transmittance and thus it gives polycarbonates having better optical properties than the known prior art processes.

DETAILED DESCRIPTION

The process of the invention is carried out at a temperature in the range from 0 to 40° ° C. by reacting 1.1 to 1.3 moles and preferably 1.2 to 1.3 moles of phosgene with one mole of a dihydric phenol or a mixture of dihydric phenols with an aqueous alkali metal hydroxide solution and an organic solvent for the polycarbonate oligomers which are formed. In general, the initial charge for the process is such that the organic solvent solution of the polycarbonate oligomers has about 5 to about 60 percent by weight of oligomers and preferably in the range from 15 to 50 percent by weight.

After the polycarbonate oligomers are formed, the reaction mixture is diluted with about 25 to 125 volume percent of additional solvent based on the original amount used.

An interfacial polymerization catalyst is then added in an effective amount generally ranging from 0.05 to 5.0 weight percent based on the dihydric phenol used, the mixture is stirred for 5 to 60 minutes and preferably 10 to 30 minutes at a temperature of 10° to 40° C. and preferably 20° to 30° C., and the polycarbonate solution is recovered.

When phenol is used as a chain stopper, it is desirable to add about 0 to 30% of the total effective amount of the polymerization catalyst before the phosgenation reaction, with the remainder or 70 to 100 percent being added for the polymerization reaction.

If tertiary butyl phenol is used, it is desirable to add all the polymerization catalyst after the phosgenation reaction.

The final polycarbonate resins can be recovered by pouring the polycarbonate solution into an excess of a non-solvent for the resin such as hexane, ethanol, or petroleum ether. The precipitated resin is then filtered and dried.

The dihydric phenols employed in the practice of this invention are known dihydric phenols in which the sole reactive groups are the two phenolic hydroxyl groups. Some of these are represented by the general formula

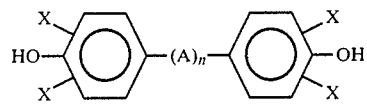

where A is a divalent hydrocarbon radical containing 1-15 carbon atoms,

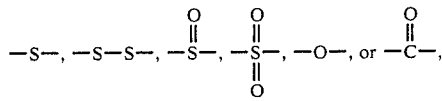

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

One group of suitable dihydric phenols are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydrophenyl)nonane
2,2-bis(3,-ethyl-4-hydroxyphenyl)octane
4,4-bis(4-hydroxyphenyl)heptane
3,3-bis(3-methyl-4-hydroxyphenyl)hexane
3,3-bis(3,5-difluoro-4-hydroxyphenyl)butane
2,2-bis(3,5-difluoro-4-hydroxyphenyl)butane
2,2-bis(4-hydroxyphenyl)propane (Bis A)
1,1-bis(3-methyl-4-hydroxyphenyl)ethane
1,1-bis(4-hydroxyphenyl)methane.

Another group of dihydric phenols useful in the practice of the present invention include the dihydroxyl diphenyl sulfoxides such as for example:
bis(3,5-diisopropyl-4-hydroxyphenyl)sulfoxide
is(3-methyl-5-ethyl-4-hydroxyphenyl)sulfoxide
bis(3,5-dibromo-4-hydroxyphenyl)sulfoxide bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxaryl sulfones such as, for example:
bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

Examples of useful organic solvents that can be used herein are hydrocarbon solvents such as cyclohexane, benzene, toluene, and xylene. Examples of useful halogenated solvents are 1,1,2,2-tetrachloro ethane, methylene chloride, 1,2-dichloro ethylene, trichloromethane, and 1,1,2-trichloroethane.

The interfacial polymerization catalysts used herein are well known and include for example the trialkylamines such as triethylamine, triamylamine, tributylamine, tripropylamine, and the like; the quaternary ammonium compounds such as tetramethyl ammonium hydroxide, octadecyl triethyl ammonium chloride, benzyl trimethyl ammonium chloride and the like.

If desired, well known chain stoppers such as p-tertiarybutyl phenol and phenols can be added to the reaction mixture to control the molecular weight of the polycarbonate resins.

Reducing agents such as alkali metal sulfides, dithionites and sufites can also be used to remove trace amounts of oxygen during the reaction.

The following examples and controls are presented to illustrate but not limit the invention.

CONTROL A

Dilution after polycondensation with TEA (triethylamine) catalyst

Into a mixture of 272.4 parts by weight of 4,4'-dihydroxy diphenyl-2,2-propane (bisphenol A), 145 parts by weight of sodium hydroxide, 1045 parts by weight of deionized water, 1330 parts by weight (1.0 liter) of methylene chloride and 5.55 parts by weight p-tert-butylphenol, 150 parts by weight of carbonyl chloride were added over a period of 0.5 hour with stirring and at a temperature of 25° C. This resulted in solution of bisphenol A polycarbonate oligomers in methylene chloride at a concentration of about 23 percent by weight in the organic phase Then, 0.946 parts by weight of triethylamine were added. Stirring was continued for fifteen minutes, the agitation was stopped, the aqueous layer removed, and 1.0 liter of additional methylene chloride was added.

The resulting polymer solution containing about 11.5 percent by weight polymer was washed twice with 10% aqueous hydrochloric acid, twice with water and dried. After precipitation of the polymer with n-heptane, the optical properties of molded discs of the precipitated polymer were determined. Gel permeation chromotography (GPC) analysis gave the molecular weight data.

CONTROL B

Dilution before phosgenation with TEA catalyst

Control A was repeated except that two liters of methylene chloride were charged to the reactor initially and no additional methylene chloride was added. This resulted in a concentration of polycarbonate polymer of about 11.5 percent by weight in the organic phase.

EXAMPLE NO. 1

Dilution before polycondensation with TEA (triethylamine) catalyst

Into a mixture of 272.4 parts by weight of 4,4'-dihydroxy diphenyl-2,2-propane (Bis A), 145 parts by weight of sodium hydroxide, 1045 parts by weight of deionized water, 1330 parts by weight (1.0 liter) of methylene chloride and 5.55 parts by weight p-tert-butylphenol, 150 parts by weight of carbonyl chloride were added over a period of 0.5 hour with stirring and at a temperature of 25° C. This resulted in a concentration of polycarbonate oligomers of about 23 percent by weight in the organic phase.

One liter of additional methylene chloride was added to the oligomer solution. Then, 0.946 parts by weight of triethylamine were added. Stirring was continued for fifteen minutes, the agitation was stopped, and the aqueous layer was removed.

The resulting polymer solution was washed twice with 10% aqueous hydrochloric acid, twice with water and dried. After precipitation of the polymer with n-heptane, the optical properties of molded discs of the precipitated polymer were determined. Gel permeation chromatography (GPC) analysis gave the molecular weight data.

EXAMPLE NO. 2

Dilution before polycondensation with TEA

Into a mixture of 272.4 parts by weight of 4,4'-dihydroxy diphenyl-2,2-propane (Bis A), 194 parts by weight of 50% aqueous sodium hydroxide, 900 parts by weight of deionized water, 1330 parts by weight (1.0 liter) of methylene chloride and 5.6 parts by weight p-tertbutylphenol, 151 parts by weight of carbonyl chloride were added incrementally over a period of 0.5 hour with stirring and at a temperature of 22° to 25° C. Near the end of the carbonyl chloride addition, 96 parts by weight of additional 50% aqueous sodium hydroxide were added. This resulted in an organic phase containing about 23 percent by weight of oligomers. 500 ml of additional methylene chloride was added to the oligomer solution to give an organic phase containing about 15.6 percent by weight of oligomers.

Then, 0.946 parts by weight of triethylamine were added. Stirring was continued for fifteen minutes, the agitation was stopped, and the aqueous layer was removed.

The resulting polymer solution was washed twice with 10% aqueous hydrochloric acid, twice with water and dried. After precipitation of the polymer with n-heptane, the optical properties of molded discs of the precipitated polymer were determined. Gel permeation chromatography (GPC) analysis gave the molecular weight data.

CONTROL C

Example 2 was repeated without the addition of methylene chloride before the polymerization step.

EXAMPLE No. 3

A 3785 liter (1000 gallon) reactor was charged with 1088.6 kg (2400 pounds) of water; 1124.9 kg (2480 pounds) of methylene chloride; 317.5 kg (700 pounds) of bisphenol A; 4,53 kg (10 pounds) of 90% phenol, and 226.8 kg (500 pounds) of aqueous sodium hydroxide containing 50% by weight NAOH. The mixture was then cooled to a temperature in the range of 20°–25° C.

In the reactor was then added in sequence, 92.9 kg (205 pounds) of phosgene; 115.6 kg (255 pounds) of 50% aqueous NaOH; 86.2 kg (190 pounds) of phosgene; and 493.1 kg (1087 pounds) of methylene chloride with constant stirring of the reactor. The organic phase contained about 32 percent by weight of oligomers.

The contents of the above reactor were then transferred to a 7520 liter (2000 gallon) reactor and 1578.5 kg (3480 pounds) of methylene chloride, and 1063 grams of triethyl amine were added with stirring to give an organic phase containing about 11.2 percent by weight of polymer. After 15 minutes, 13.6 kg (30 pounds) phosgene was added to bring the pH in the reactor to 8.5.

After 15 minutes of stirring, the stirrer was turned off and the aqueous phase was allowed to separate from the organic phase containing the polycarbonate. The polycarbonate resin was recovered in the manner set forth in Control A.

Over a series of 22 runs, the recovered polymer had an average yellowness index of 2.4 (standard deviation of 0.6), a percent transmittence of 89.9 (standard deviation 1.0), and a weight average molecular weight of 33,200 (standard deviation 200).

CONTROL D

Dilution after polycondensation with 4-dimethylaminopyridine (DMAP) catalyst

Control A was repeated except that 1.14 grams of 4-dimethylaminopyridine dissolved in 3.3 ml of methylene chloride was used in place of the triethylamine to catalyze the polymerization.

CONTROL E

Dilution after polycondensation

The procedure of Control D was repeated.

EXAMPLE NO. 4

Dilution before polycondensation with DMAP catalyst

Example No. 1 was repeated except that 1.14 grams of 4-dimethylaminopyridine dissolved in 4 ml of methylene chloride was used in place of the triethylamine to catalyze the polymerization.

The color, clarity and the molecular weight of the examples and the controls are set forth in Table I.

TABLE I

| Sample | Catalyst | yellowness Index[1] | % transmittance[2] | molecular Weight[3] | % Dilution B.P.[4] |
|---|---|---|---|---|---|
| Control A | TEA | 3.9 | 89.1 | 33,900 | |
| Control B | TEA | 3.6 | 89.1 | 35,000 | |
| Ex. #1 | TEA | 2.6 | 90.4 | 31,500 | 100 |
| Control C | TEA | 2.6 | 89.9 | 34,300 | |
| Ex. #2 | TEA | 2.2 | 90.7 | 32,300 | 50 |
| Ex. #3 | TEA | 2.4 | 89.9 | 33,200 | 100 |
| Control D | DMAP | 2.8 | 88.5 | 33,200 | |
| Control E | DMAP | 3.2 | 88.9 | 31,300 | |
| Ex. #4 | DMAP | 1.9 | 89.5 | 39,200 | 100 |

[1] determined by ASTM D 1925.
[2] determined by ASTM D 1003.
[3] determined by gel permeation chromatography.
[4] B.P. = before polycondensation.

The data in Table I shows that if the reaction mixture is diluted after the phosgenation step and before the polycondensation step there is a 33.3% and 27.7% reduction in yellowness index when one compares Example 1 with Controls A and B respectively. In the same manner, there is a 32.1% and 40.6% reduction when one compares Example 4 with Controls D and E respectively. Also there is a desirable increase in the percent transmittance of Example 1 and 2 over the controls.

Example 3 shows a 38.5% and a 33.3% reduction in the yellowness index compared to Controls A and B. Example 2 shows a 15.3% reduction compared to Control C.

I claim:

1. In an interfacial process for the production of a polycarbonate resin having improved optical properties wherein a dihydric phenol or a mixture of dihydric phenols is first reacted with phosgene in contact with an organic solvent for said resin to generate polycarbonate oligomers by a phosgenation reaction and an interfacial polymerization catalyst is added to generate a polycarbonate resin by a polycondensation reaction of said oligomers, the improvement which comprises adding 25 to 125 percent by volume additional solvent based on the original amount of said solvent to the reaction after said phosgenation reaction and before said polycondensation reaction.

2. The process of claim 1 wherein the amount of said additional solvent is in the range from 40 to 100 percent by volume.

3. A process for the preparation of a polycarbonate resin having improved optical properties which comprises
    (A) reacting 1.1 to 1.3 moles of phosgene with a mixture of one mole of a dihydric phenol or a mixture of dihydric phenols, an aqueous alkali metal hydroxide solution, about 0 to 30% of an effective amount of an interfacial catalyst, and an organic solvent for said resin to form a reaction mixture containing polycarbonate oligomers,
    (B) adding to said reaction mixture 25 to 125 percent by volume additional solvent based on the original amount of said solvent,
    (C) adding about 70 to 100% of an effective amount of an interfacial polymerization catalyst,
    (D) stirring the reaction mixture containing an aqueous layer and a solvent layer for 5 to 60 minutes at a temperature in the range from 10° to 40° C. to complete the polymerization reaction, and
    (E) recovering the polycarbonate solution from which the polycarbonate resin is recovered.

4. The process as set forth in claim 3 wherein the amount of additional solvent added is 40 to 100 percent by volume.

5. The process as set forth in claim 3 wherein the amount of the interfacial polymerization catalyst used is 0.05 to 5 percent by weight based on the dihydric phenol.

6. In an interfacial process for the production of a polycarbonate resin having improved optical properties wherein a dihydric phenol or a mixture of dihydric phenols is first reacted with phosgene in contact with an halogenated solvent for said resin to generate polycarbonate oligomers by a phosgenation reaction and an interfacial polymerization catalyst is added to generate a polycarbonate resin by a polycondensation reaction, the improvement which comprises adding 25 to 125 percent by volume additional solvent based on the original amount of said solvent to the reaction after said phosgenation reaction and before said polycondensation reaction.

7. The process of claim 6 wherein the amount of said additional solvent is in the range from 40 to 100 percent by volume of the original amount of solvent used 8. The process of claim 6 wherein the halogenated solvent is selected from the group consisting of 1,1,2,2-tetrachloroethane, methylene chloride, 1,2-dichloroethylene, trichloromethane, and 1,1,2-trichloroethane.

9. A process for the preparation of a polycarbonate resin having improved optical properties which
  (A) reacting 1.1 to 1.3 moles of phosgene with a mixture of one mole of a dihydric phenol or a mixture of dihydric phenols, an aqueous alkali metal hydroxide solution, and a halogenated solvent for said resin to form a reaction mixture containing polycarbonate oligomers,
  (B) adding to said reacting mixture 25 to 125 percent by volume additional halogenated solvent based on the original amount of said solvent,
  (C) adding an effective amount of an interfacial polymerization catalyst,
  (D) stirring the reaction mixture containing an aqueous layer and a solvent layer for 5 to 60 minutes at a temperature in the range from 10° to 40° C. to complete the polymerization reaction, and
  (E) recovering the polycarbonate solution from which the polycarbonate resin is recovered.

10. The process as set forth in claim 9 wherein the amount of additional solvent added is 40 to 100 percent by volume.

11. The process as set forth in claim 9 wherein the amount of the interfacial polymerization catalyst used is 0.05 to 5 percent by weight based on the dihydric phenol.

12. The process as set forth in claim 9 wherein the halogenated solvent is selected from the group consisting of 1,1,2,2-tetrachloroethane, methylene chloride, 1,2-dichloroethylene, trichloromethane, and 1,1,2-trichloroethane.

13. A process for the preparation of a polycarbonate resin having improved optical properties which comprises
  (A) reacting 1.1 to 1.3 moles of phosgene with a mixture of one mole of a dihydric phenol or a mixture of dihydric phenols, an aqueous alkali metal hydroxide solution, about 0 to 30% of an effective amount of an interfacial catalyst, and an organic solvent for said resin to form a solvent-water reaction mixture containing about 5 to about 60 percent by weight of polycarbonate oligomers in the solvent phase,
  (B) adding to said reaction mixture 25 to 125 percent by volume additional solvent based on the original amount of said solvent,
  (C) adding about 70 to 100% of an effective amount of an interfacial polymerization catalyst,
  (D) stirring the reaction mixture for 5 to 60 minutes at a temperature in the range from 10° to 40° C. to complete the polymerization reaction, and
  (E) recovering the polycarbonate solution from which the polycarbonate resin is recovered.

14. The process as set forth in claim 13 wherein the amount of additional solvent added is 40 to 100 percent by volume.

15. The process as set forth in claim 13 wherein the amount of the interfacial polymerization catalyst used is 0.05 to 5 percent by weight based on the dihydric phenol.

16. The process of claim 13 wherein the solvent is selected from the group consisting of 1,1,2,2-tetrachloroethane, methylene chloride, 1,2-dichloroethylene, trichloromethane, and 1,1,2-trichloroethane.

* * * * *